(12) United States Patent
Stiermann (10) Patent No.: US 8,365,526 B2
(45) Date of Patent: Feb. 5, 2013

(54) VEHICLE OR STATIONARY POWER PLANT HAVING A TURBOCHARGED INTERNAL COMBUSTION ENGINE AS A DRIVE SOURCE

(75) Inventor: Erwin Stiermann, Neusass (DE)

(73) Assignee: MAN Truck & Bus AG (DE)

( * ) Notice: Subject to any disclaimer, the term of this patent is extended or adjusted under 35 U.S.C. 154(b) by 267 days.

(21) Appl. No.: 12/577,665

(22) Filed: Oct. 12, 2009

(65) Prior Publication Data

US 2010/0146969 A1 Jun. 17, 2010

Related U.S. Application Data

(63) Continuation of application No. 11/686,149, filed on Mar. 14, 2007, now abandoned.

(30) Foreign Application Priority Data

Mar. 15, 2006 (DE) .......................... 10 2006 011 797

(51) Int. Cl.
  *F02B 29/04* (2006.01)
  *F02B 37/00* (2006.01)
  *F01K 23/10* (2006.01)

(52) U.S. Cl. ........................... 60/599; 60/618

(58) Field of Classification Search ............ 60/616–618, 60/605.1, 599; 123/41.1, 41.31; 417/406–409; B63H 21/12; F02B 39/00, 29/04; F02G 5/04; F02C 7/244, 7/16
See application file for complete search history.

(56) References Cited

U.S. PATENT DOCUMENTS

| | | | | |
|---|---|---|---|---|
| 2,692,759 A * | 10/1954 | Swenson et al. | ............... | 165/292 |
| 2,866,617 A * | 12/1958 | Land | ............... | 417/406 |
| 3,222,883 A * | 12/1965 | Glaspie | ........................ | 62/172 |
| 3,605,406 A * | 9/1971 | Woolley | ..................... | 60/39.182 |
| 3,948,052 A * | 4/1976 | Merkle et al. | ................. | 60/605.1 |
| 3,986,938 A * | 10/1976 | Smith, Jr. | ......................... | 203/11 |
| 4,068,612 A * | 1/1978 | Meiners | ..................... | 440/89 R |
| 4,520,767 A * | 6/1985 | Roettgen et al. | ............. | 123/41.1 |
| 4,996,845 A * | 3/1991 | Kim | .................................. | 60/618 |
| 5,020,319 A * | 6/1991 | Matsuura et al. | ............... | 60/321 |
| 5,087,176 A * | 2/1992 | Wieland | ........................ | 417/407 |
| 5,463,867 A * | 11/1995 | Ruetz | .............................. | 60/602 |
| 5,609,029 A * | 3/1997 | Ahnger et al. | ................... | 60/618 |
| 6,513,328 B2 * | 2/2003 | Baeuerle et al. | ................ | 60/599 |
| 6,553,762 B2 * | 4/2003 | Loffler et al. | ................ | 60/605.1 |
| 7,021,059 B2 * | 4/2006 | Shinohara et al. | .............. | 60/618 |
| 7,305,829 B2 * | 12/2007 | Mirolli et al. | ................... | 60/649 |
| 2005/0279093 A1* | 12/2005 | Wang et al. | ..................... | 60/599 |
| 2007/0074515 A1* | 4/2007 | Yoshino | ......................... | 60/670 |

FOREIGN PATENT DOCUMENTS

| | | | | |
|---|---|---|---|---|
| CN | 201071740 Y | * | 6/2008 | |
| DE | 2838490 B | * | 2/1980 | |
| JP | 60090923 A | * | 5/1985 | |
| JP | 60212617 A | * | 10/1985 | |

(Continued)

*Primary Examiner* — Thai Ba Trieu
(74) *Attorney, Agent, or Firm* — Robert W. Becker; Becker & Stachniak, P.C.

(57) ABSTRACT

A vehicle or stationary power plant having an internal combustion engine as a drive source and having components adapted to be supplied with heat from a medium accommodated in a closed loop The turbine of the exhaust gas turbocharger provided for turbocharging the internal combustion engine acts as a heat source. A heat exchanger is disposed externally on the turbine housing and can be incorporated or switchable into the medium loop The medium can be conveyed directly or channeled through the interior of the heat exchanger, and the medium is adapted to be heated up in such interior utilizing at least thermal radiation energy from the hot turbine housing.

22 Claims, 10 Drawing Sheets

FOREIGN PATENT DOCUMENTS

| | | | | |
|---|---|---|---|---|
| JP | 62294724 | A | * | 12/1987 |
| JP | 01178723 | A | * | 7/1989 |
| JP | 2004353589 | A | * | 12/2004 |
| JP | 2007211681 | A | * | 8/2007 |
| JP | 2008019711 | A | * | 1/2008 |
| JP | 2008128254 | A | * | 6/2008 |
| JP | 2008215184 | A | * | 9/2008 |
| JP | 2008267257 | A | * | 11/2008 |

* cited by examiner

VEHICLE OR STATIONARY POWER PLANT HAVING A TURBOCHARGED INTERNAL COMBUSTION ENGINE AS A DRIVE SOURCE

CROSS-REFERENCE TO RELATED APPLICATIONS

This application is a continuation application of Ser. No. 11/686,149 filed Mar. 14, 2007 now abandoned.

The present specification for the instant application should be granted the priority date of Mar. 15, 2006, the filing date of the corresponding German patent application 102006011 797.2.

BACKGROUND OF THE INVENTION

The present invention relates to a vehicle or a stationary power plant.

In a vehicle or a stationary power plant, an array of components and units, such as crankcase, cylinder heads, radiators, and containers, which have a medium that is accommodated in a closed loop flowing through them is disposed on the internal combustion engine which forms a drive or motive power source, and in its surroundings. In the case of a cooling loop, providing electrical auxiliary units, via which the coolant is heatable, is known for improving the cold start behavior of the internal combustion engine and for more rapid availability of heating warmth. These electrical auxiliary heaters are typically relatively expensive and load the energy-providing battery because of their high energy demand, Such electrical auxiliary heaters are also provided, for example, for those cases when the coolant loop of the internal combustion engine is also used for thawing a urea-water solution (used as an ammonia provider for $NO_2$ reduction in SCR catalytic converters) which is stored in a container and freezes at temperatures below approximately $-12°$ C. Because the battery is particularly strongly loaded in the event of low negative temperatures which exist over a long period of time or, in specific areas of the world, always, electrical auxiliary heaters for coolant water heating are to be put into operation only as long as absolutely necessary if possible. For the remainder of the internal combustion engine or vehicle operating time, they are not needed.

It is therefore the object of the present invention to provide means for a vehicle or a stationary power plant of the aforementioned general type according to the species which allow electrical auxiliary heaters for heating a medium accommodated in a closed loop to be dispensed with.

SUMMARY OF THE INVENTION

This object is achieved according to the present invention by a vehicle or stationary power plant having an internal combustion engine as a drive or motive power source. and having components that may be supplied with heat by a medium that is accommodated in a closed medium loop or circuit, wherein an exhaust gas turbocharger is provided for turbocharging the internal combustion engine wherein the turbine of the exhaust gas turbocharger is used and/or implemented as a heat source and, for this purpose, a heat exchanger is externally situated on the turbine housing. which is incorporated or switchable in the medium loop and in whose interior the medium, which is conducted through directly or channeled, is heatable using at least the thermal radiant energy of the hot turbine housing.

The present invention is directed to the fact that the turbine of the exhaust gas turbocharger of an internal combustion engine is the assembly which becomes warm and/or hot and radiates heat most rapidly after its cold start. Until now. the waste heat of the turbine has been viewed as rather troublesome in particular when it is nearly red-hot in full-load operation. Vehicle parts situated in the surroundings of the hot turbine are partitioned from the effect of heat which is too strong by insulating walls or heat shields, in addition, the turbine is intensively cooled. In contrast, the present invention makes use of the rapid heating of the turbine, by using it entirely intentionally as a heat source for a medium that is to be heated. This is performed via a heat exchanger which is situated externally on the turbine housing. The medium to be heated may be conducted through its interior either directly or channeled, When conducted through directly, the medium absorbs heat from the hot turbine housing, more or less depending on the dwell time in the heat exchanger interior or on the flow velocity, if the medium to be heated is conducted channeled through the interior of the heat exchanger. the possibility exists of additionally feeding or conducting exhaust gas of the internal combustion engine into the heat exchanger interior. so that the heat content of the exhaust gas is additionally usable for heating the medium, in addition to the radiant energy of the turbine housing.

The heat exchanger may be implemented and/or situated on the turbine housing in various ways. The drawing and associated description of the figures provide information about some of these embodiments.

The way according to the present invention of warming or heating the medium permits greatly varying usages of this medium heated in this way because of the high possible energy introduction—even connected with a change of the physical state from liquid to vaporous. Such an application is, for example, the rapid warming up of the liquid coolant (water or coolant water mixed with antifreeze) of an internal combustion engine after its cold start. In other applications, the heated medium is conducted via a heat consumer incorporated or switched into the medium loop, such as a container, so that the liquid stored or located therein may be warmed or heated or may be prevented from freezing or may be thawed rapidly after a cold start of the internal combustion engine. This heat consumer may, for example, be a storage container for a urea-water solution or a windshield, headlight, and/or outside mirror cleaning liquid, or a radiator which conducts coolant water or a coolant water equalizing container. However. electrical storage batteries for vehicle heaters are also beatable using the medium heated according to the present invention. The medium heated according to the present invention may. for example. also be supplied in a touring bus or mobile home to the hot water container of the onboard kitchen or the washing water storage container of the onboard toilet for the purpose of heating or keeping warm or as a freezing protection. Furthermore, the medium. if it is a low-boiling liquid, may be converted from the liquid into its vaporous state as it flows through the turbine-side heat exchanger and may be supplied to a steam turbine in this vaporous state, by which it may be converted into mechanical drive energy to deliver power,

BRIEF DESCRIPTION OF THE DRAWINGS

In the following, the present invention is explained in greater detail on the basis of multiple exemplary embodiments and applications illustrated in the drawings, in which.

DESCRIPTION OF SPECIFIC EMBODIMENTS

Referring now to the drawings in detail the reference numeral (e.g. FIGS. 6, 7 and 10) identifies an internal combustion engine, in particular a diesel engine, which is turbocharged using an exhaust gas turbocharger 2. This turbocharged internal combustion engine 1 forms the drive source in a vehicle or a stationary power plant. The vehicle may be a passenger automobile, a utility vehicle of any type, a rail vehicle, a water vehicle, or an aircraft. The stationary power plant may, for example, be an emergency power plant (diesel generator set), an engine-based cogeneration plant (diesel generator steam generation set), an elevator, or any other industrial facility in which an internal combustion engine is used as a drive. The vehicle or the stationary power plant has components which require warming, heating, or keeping warm and may be supplied with heat by a medium accommodated in a closed loop 3, 3'. The exhaust gas turbocharger 2 comprises an exhaust gas turbine 4 and a charge-air compressor 5. The exhaust gas turbine 4 communicates via an exhaust manifold 6 (FIGS. 4 and 5) with the exhaust gas outlets of the internal combustion engine and is supplied with exhaust gas in the direction of the arrow A. The connection between exhaust gas turbine 4 and exhaust gas manifold 13 is produced via flanges 7, 8, the flange 7 being situated at the inlet 9 of the turbine housing 10 and the flange 8 being situated at the facing end of the exhaust gas manifold 6; the two flanges 7, 8 are connected via screw connections 11. The charge-air compressor 5 supplies the inlets of the internal combustion engine 1 via its charge air collecting line.

Figure 1:
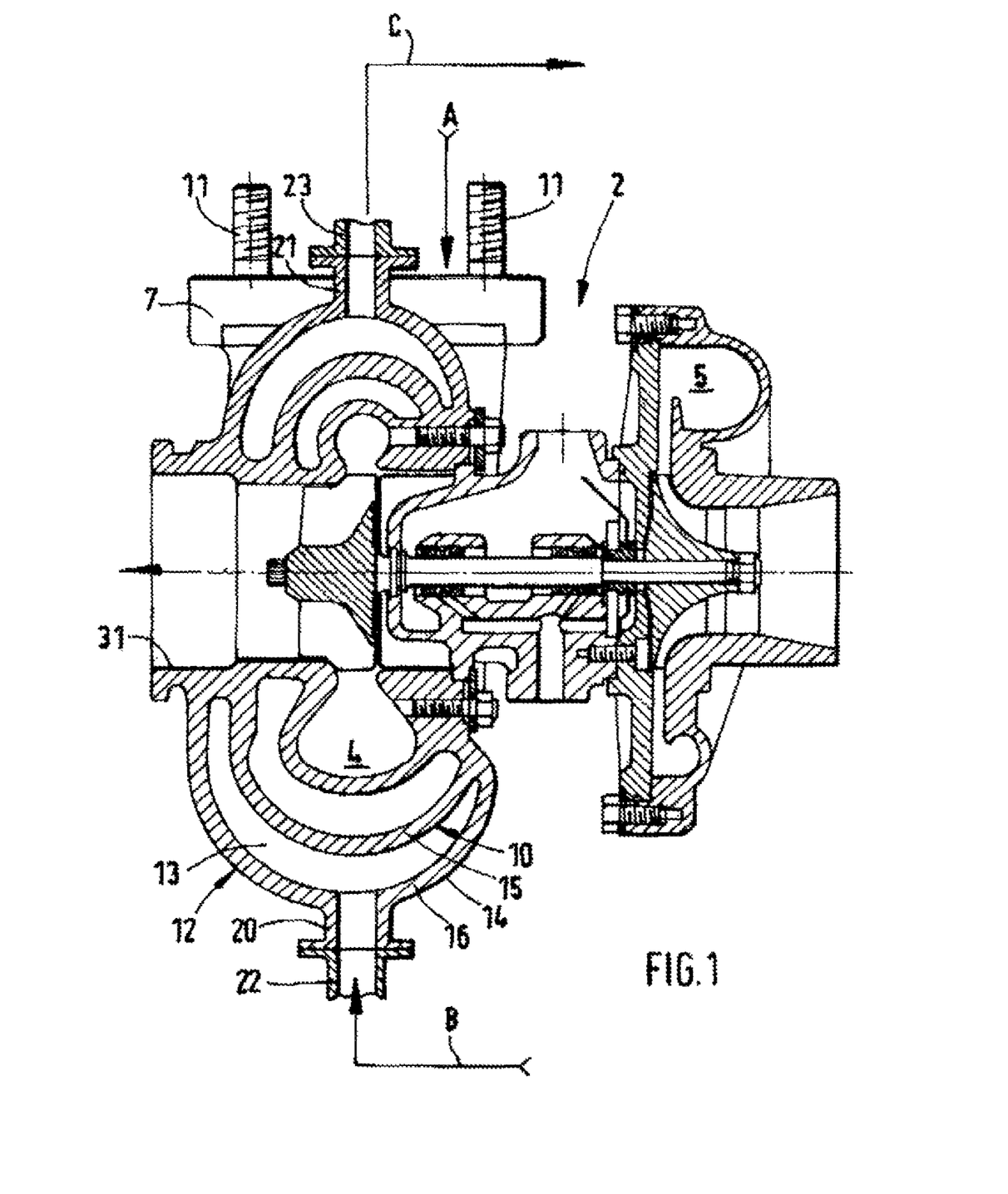
FIG. 1 shows a longitudinal section through an exhaust gas turbocharger having an embodiment of a heat exchanger according to the present invention.
Figure 2:
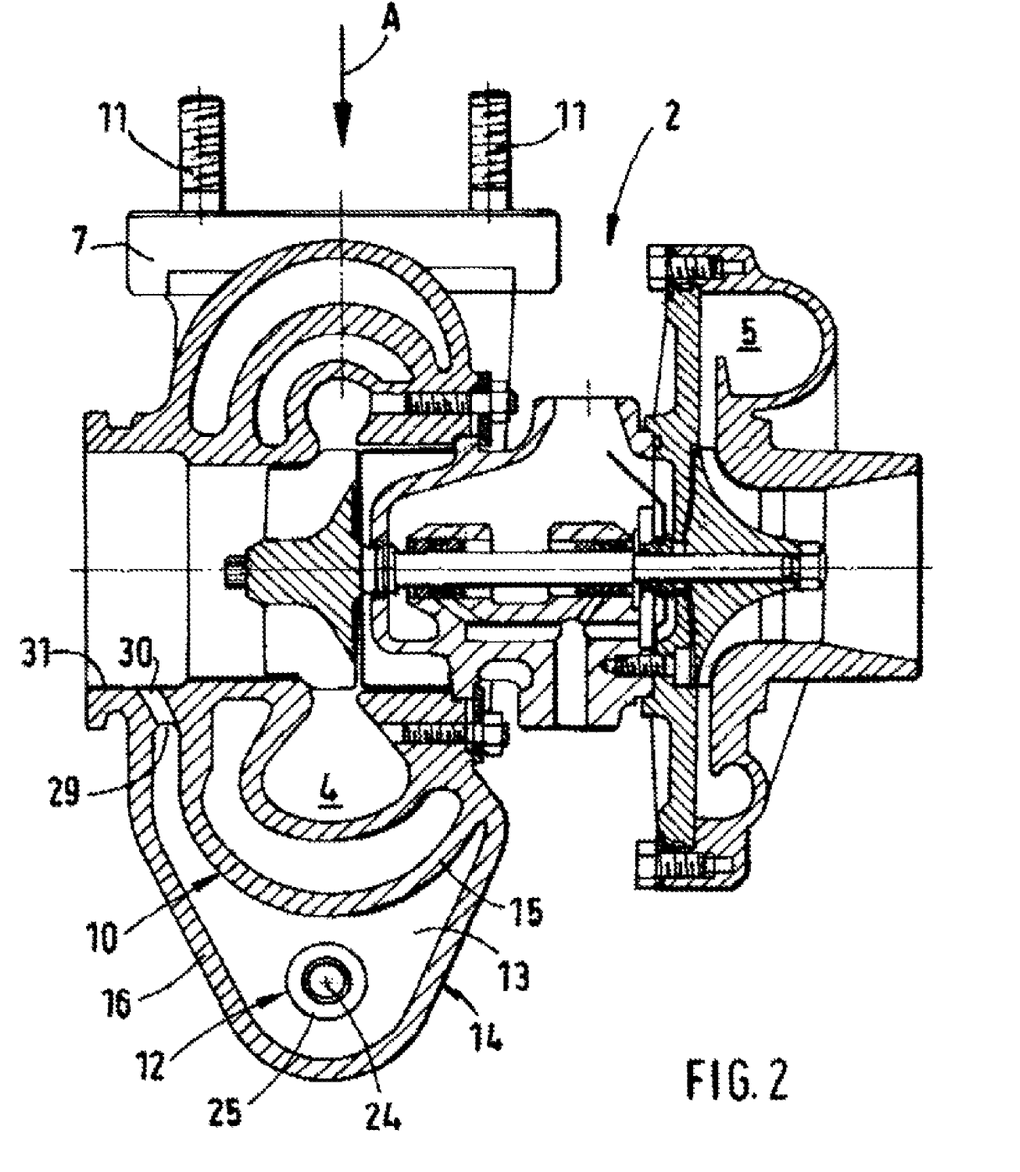
FIG. 2 shows a longitudinal section through another exhaust gas turbocharger having a further exemplary embodiment of a heat exchanger according to the present invention.
Figure 3:
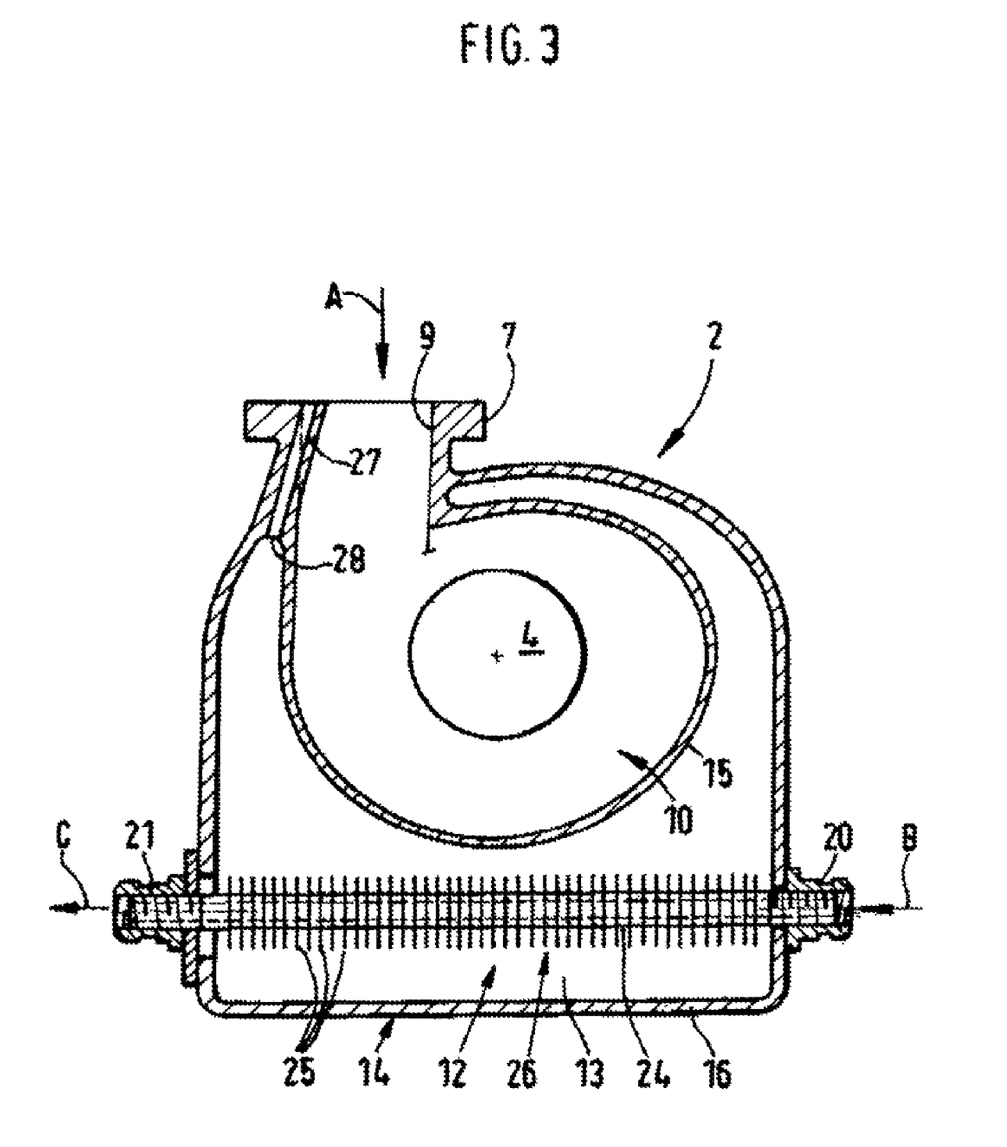
FIG. 3 shows a schematic cross-section through the turbine of the exhaust gas turbocharger from FIG. 2 in the area of the heat exchanger according to the present invention.
Figure 4:
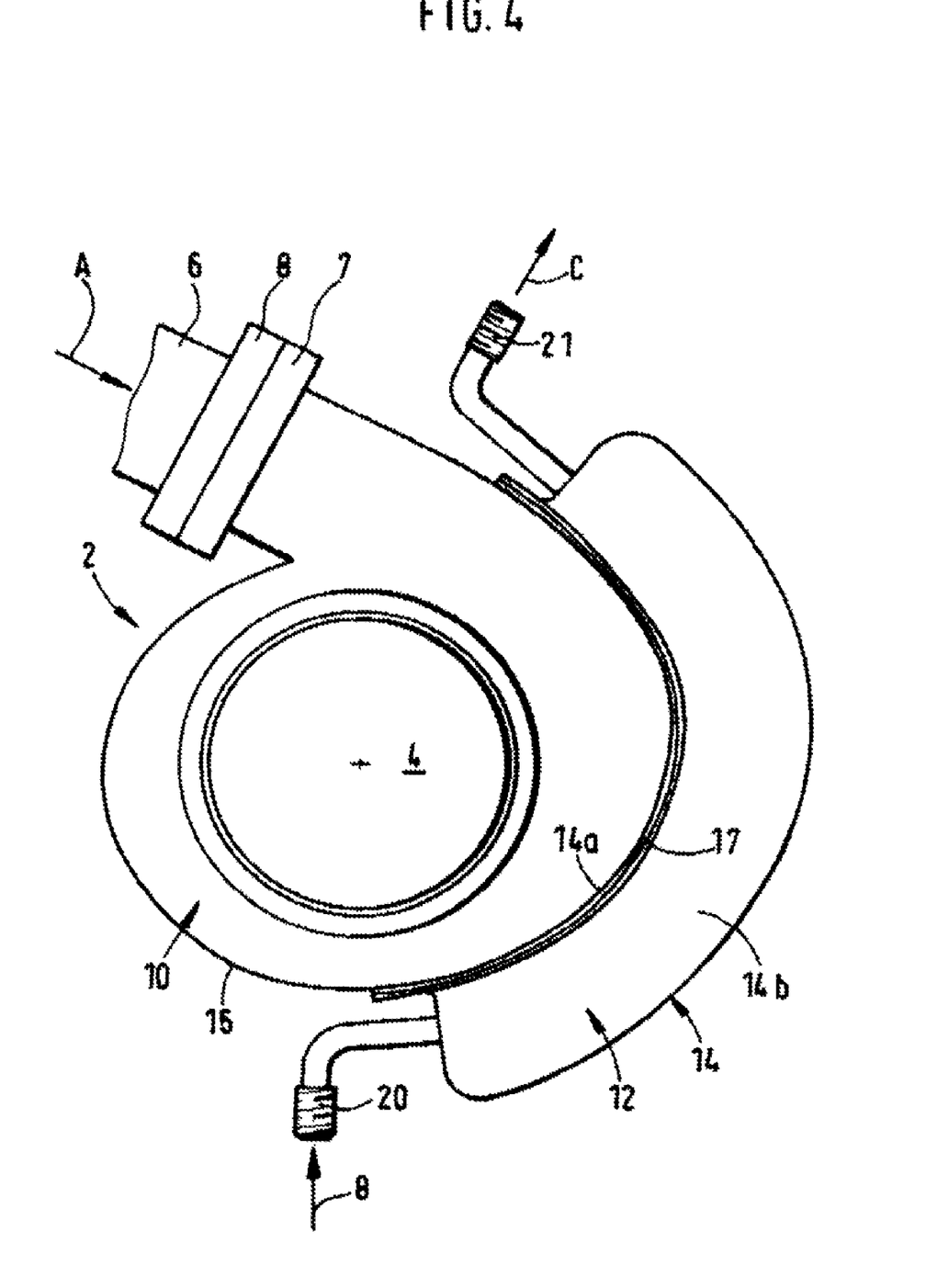
FIGS. 4 & 5 each show a schematic side view of an exhaust gas turbocharger having a further embodiment of the heat exchanger according to the present invention, FIGS. 6-10 each show an example of an application of the medium loop, in which the heat exchanger according to the present invention is incorporated or switchable.
Figure 5:
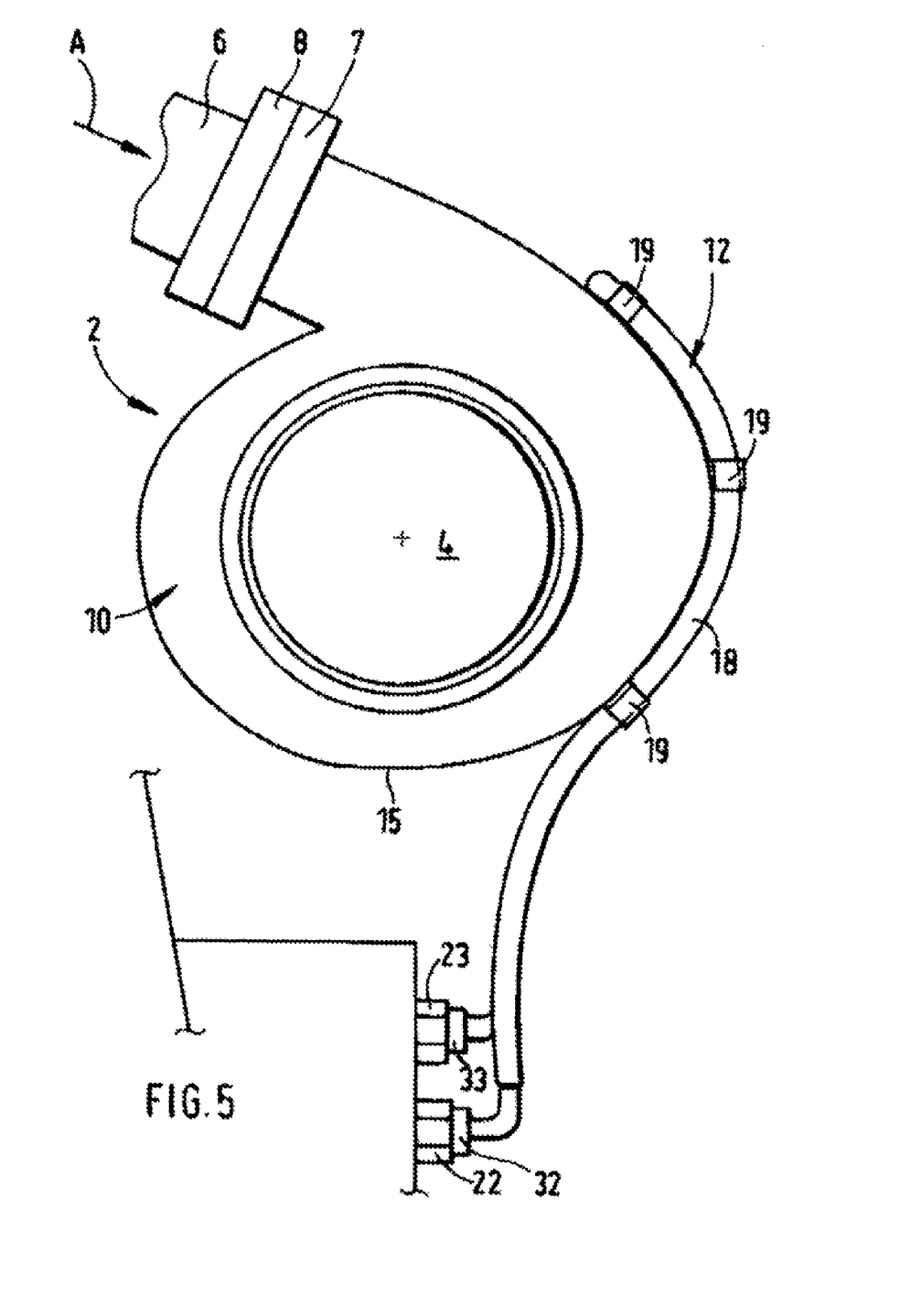

According to the present invention, the turbine 4 of the exhaust gas turbocharger 2 is used and/or implemented as a heat source for the medium. For this purpose, a heat exchanger 12 is externally situated on the turbine housing 10 is incorporated or switchable in the medium loop 3, and in whose interior 13 (FIGS. 2 and 3), the medium, which is conducted through directly or channeled, is heatable by exploiting at least the thermal radiant energy of the hot turbine housing 10. Examples of the direct conduction of the medium through the interior 13 of the heat exchanger 12 are shown in FIGS. 1, 4, and 5. In contrast, FIGS. 2 and 3 show an example of channeled or piped guiding of the medium through the interior 13 of the heat exchanger 12.

In particular if the medium to be heated is conducted channeled or piped through the interior 13 of the heat exchanger 12, it suggests itself that exhaust gas additionally be fed into or conducted through the heat exchanger interior 13 and the heat content of the exhaust gas be additionally used for heating the medium.

The heat exchanger 12 may be implemented externally on the turbine housing 10 in various ways.

For example, the heat exchanger 12 may be implemented as an integral component of the exhaust gas turbine 4 and, for this purpose, the housing 14 of the heat exchanger 12 may be formed by the turbine housing external wall 15 and a further housing external wall 16, which is cast thereon or attached thereto (see FIGS. 1, 2, and 3). in a constructed embodiment of the heat exchanger 12, an external wail 16 of the heat exchanger 12 may be produced in shell form from high-temperature sheet steel by stamping and embossing and then externally attached to the turbine housing external wail 15 by welding or by tightening strap clamps, for example. Alternatively, it is also possible, however, to implement the heat exchanger 12 having a housing 14 (see FIG. 4). which is assembled from multiple parts 14a, 14b prefinished from high-temperature sheet steel and then attach its external wall area 17 facing toward the turbine housing 10 to the provided external area of the turbine housing external wall 15—tailored to its shape and closely fitted for optimum heat transmission—e.g. by welding or using tightening straps or the like.

Alternatively, the heat exchanger 12 may also be formed by a heat exchanger pipe 18 which—as shown in FIG. 5—is attached bent or meandering on the turbine housing 10 of the exhaust gas turbine 4 on the provided external area—tailored thereto in a formatting way and closely fitted for optimum heat transmission—e.g. by multiple clamps or holders 19.

In the exemplary embodiments of FIGS. 1 through 4, a first connection 20 and a second connection 21 are provided on the housing 14 of the heat exchanger 12, a supply line 22 for the medium to be heated (arrow B) being connected to the first connection 20 and a discharge line 23 for the heated medium (arrow C) being connected to the second connection 21, which is at a distance from the first connection 20. The heat exchanger 12 is incorporated or switchable in the medium loop 3 via the supply line 22 and the discharge line 23, as explained in greater detail below.

In the case of the exemplary embodiments in FIGS. 1 and 4, the medium to be heated is conductible via the supply line 22 and the first connection 20 directly into the interior 13 of the heat exchanger 14, where it comes into contact with the hot external wall 15 of the turbine housing 10 (FIG. 1) or the housing external wall area 17 heated thereby (FIG. 4) and may thus be heated and, after a specific dwell time, is conductible back out of the heat exchanger housing 14 via the second connection 21 and may be fed via the discharge line 23 to the medium loop 3 for further use therein.

In the case of the example in FIGS. 2, 3, a heat exchanger pipe 24 extends between first connection 20 and second connection 21 of the heat exchanger 12. via which the medium to he heated is conductible channeled or piped through the interior 13 of the heat exchanger housing 14. The heat exchanger pipe 24 may extend linearly or meandering between the two connections 20, 21. Moreover, the heat exchanger pipe 24 may be externally equipped with heat-transfer ribs 25, As an alternative to a single pipe 24, a heat exchanger pipe bundle situated between two terminally situated collection chambers, which comprises a number of linear heat exchanger pipes running in parallel, which are possibly also each externally ribbed, may also extend between first connection 20 and second connection 21 of the heat exchanger 12.

The heat exchanger pipe 24 or the heat exchanger pipe bundle mentioned may be a component of a heat exchanger cartridge 26 which—as shown in FIG. 3, for example—also contains the two connections 20, 21 and may be installed prefinished in the housing 14 of the heat exchanger 12 and then extends in the installed positioned between supply line 22 and discharge tine 23, The heat exchanger pipe 24 or the heat exchanger pipe bundle absorbs the heat energy radiated from the external wall 15 of the turbine 10 inside the dosed heat exchanger housing 14. As already noted above, the heating power may be increased, if the medium is conducted through channeled or piped, by feeding exhaust gas into the interior 13 of the heat exchanger 12 This exhaust gas may be diverted from the exhaust system 6 before or in the intake 9 of the exhaust gas turbine 4 and may be fed channeled, e.g. via a hole 27 in the interior of the turbine housing. as shown in FIG. 3, into the interior 13 of the heat exchanger housing 14. This exhaust gas is then conductible back out, after a certain heat dissipating dwell time, from the heat exchanger 12 at a point 29 distal from the intake point 28, e.g., via a hole 30 in the interior of the turbine housing, as shown in FIG. 2, and conductible into the exhaust system 31 at the outlet of and/or after exhaust gas turbine 4, The dwell time of the exhaust gas in the heat exchanger may be fixed and/or adjusted indirectly, e.g. by adjustable throttles in these holes 27, 30 or by tailoring the cross-sections of these holes 27, 30, in the case of the example in FIG. 5. the heat exchanger pipe 18 has a first connection 32 at the intake, to which the supply line 22 for the medium to be heated is connected, and a second connection 33 at the outlet, to which the discharge line 23 for the heated medium is connected.

Independently of its different embodiments, the heat exchanger 12 having its supply line 22 and discharge line 23 may be switched into the medium loop 3 and/or 3' if needed. The need for this connection is detected by one or more temperature sensors at a location where the heated medium is to be active, for example. The heat exchanger 12 is switched into and out of the medium loop 3 by switchable changeover valves 35, 36, for example. which receive their switching commands from an electronic regulating and control unit (not shown), and which are connected to one another via a line section 37 which bypasses the heat exchanger 12 as a bypass if the latter is not incorporated in the medium loop 3, 3'.

In the following, various medium loops 3, 3' and their implementation and use are discussed in greater detail with reference to FIGS. 6 through 10.

Figure 6:
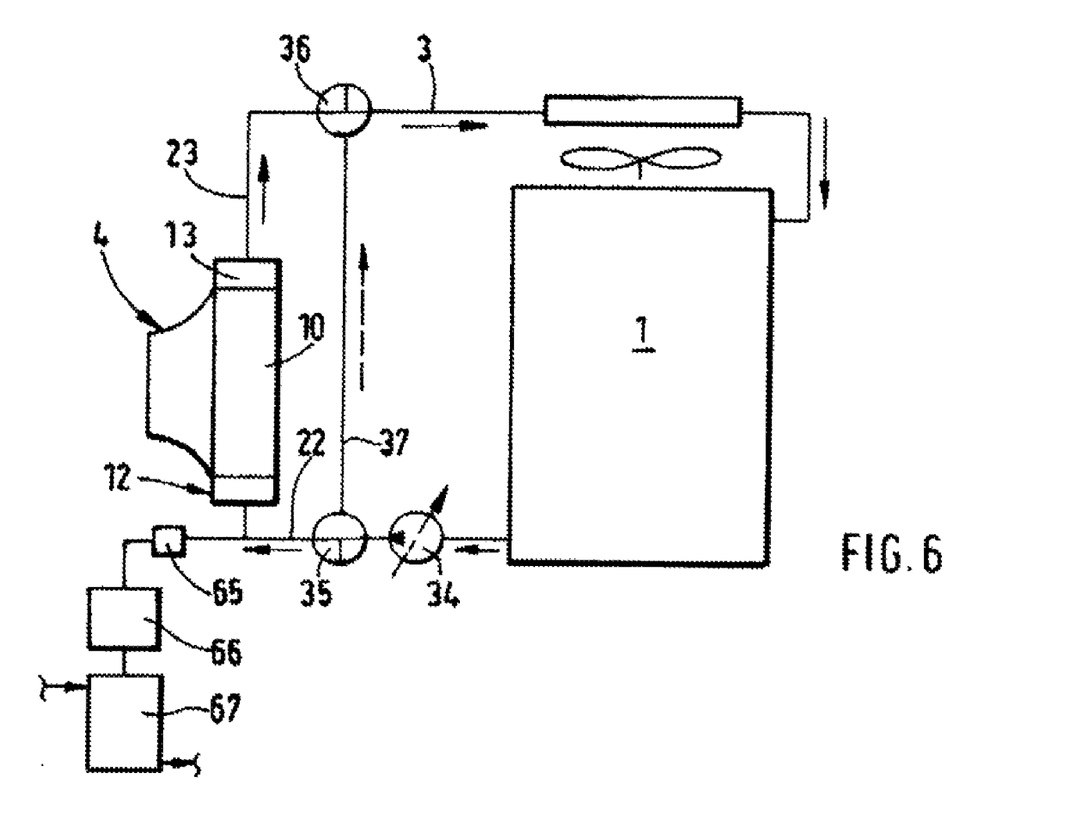

FIG. 6 is the medium loop 3 around the coolant loop of the internal combustion engine 1, and the medium located therein, which is circulated using a pump 34, is the liquid coolant—coolant water and/or coolant water mixed with antifreeze—of the internal combustion engine 1. The heat exchanger 12 according to the present invention may be switched into this coolant loop 3 if needed via the changeover valves 35, 36. always, for example when rapid heating of the coolant is necessary after a cold start of the internal combustion engine 1. The heat exchanger 12 is switched into the coolant loop 3 in this way via a temperature-controlled regulator/controller having a corresponding influence on the switch position of the changeover valves 35. 36, The heat exchanger 12 is then switched back out of the coolant loop by corresponding changeover of the changeover valves 35, 36, for example. when the coolant water has been sufficiently preheated.

Figure 7:
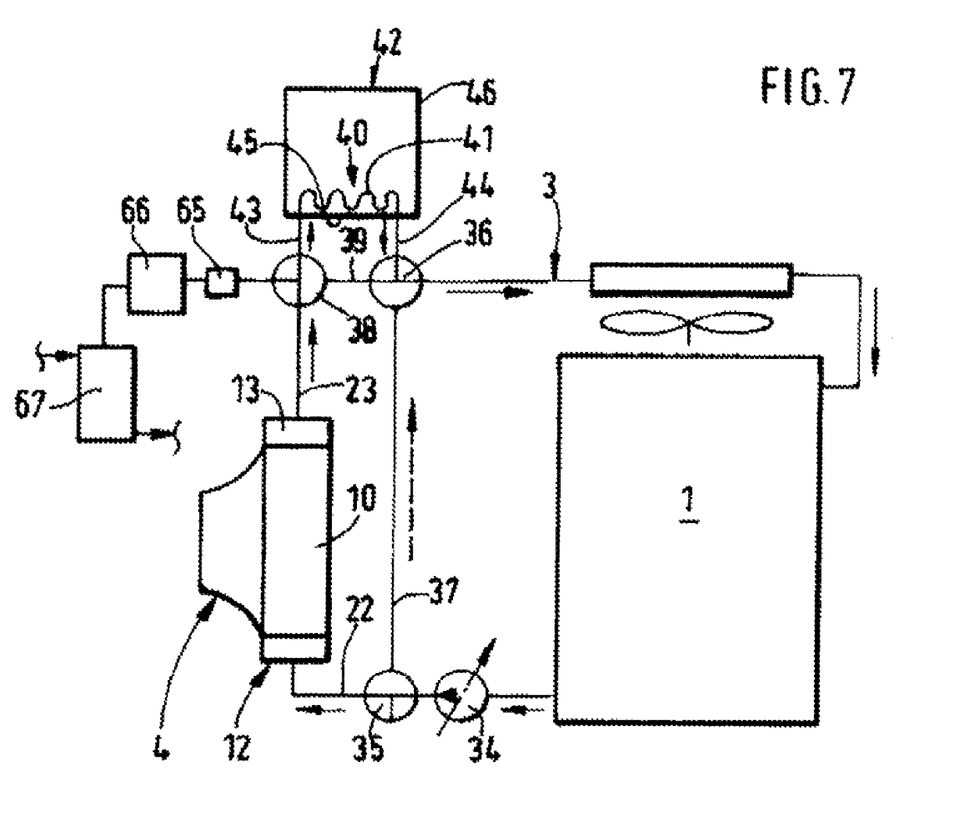

In FIG. 7, as in FIG. 6, the medium loop 3 is also the coolant loop of the internal combustion engine 1 and the medium circulated therein using a pump 34 is water and/or water mixed with antifreeze, in addition. a third switchable changeover valve 38 is provided here, which the discharge line 23 leads to and which is connected via a line section 39 to the second changeover valve 36. A heating circuit is identified by 40, which comprises a heating element 41 in and/or on a heat consumer 42, a supply line 43, which originates at the changeover valve 38 and communicates with the heating element 41, and a return line 44, which originates at the heating element 41 and leads to the changeover valve 36. This heating circuit 40 is used for delivering heat to the heat consumer 42, which may be a container, for example, in which a received and/or stored liquid is to be heated, kept warm, prevented from freezing, or thawed after freezing. The heating element 41 may be formed as a linear or coiled and/or meandering heating pipe or by a heating pipe embedded in depressions of the floor 45 or the wall 46 of the heat consumer 42/container or a heating pipe integrated in the material of the floor 45 or the wall 46 of the heat consumer 42/container. This heating circuit 40 is switchable if needed into the medium loop 3—the coolant loop of the internal combustion engine 1 here—via the changeover valves 35, 36, 38 in series to the heat exchanger 12. This activation of the heating circuit 40 and heat exchanger 12 is performed temperature-controlled, e.g if a heat demand is established by a controller/regulator, using a sensor on the heat consumer or an internal sensor, having appropriate influence on the switch positron of the three changeover valves 35, 36, 38. If the heat exchanger 12 and the heating circuit 40 are switched into the medium loop 3, the medium is supplied using the pump 34 to the heat exchanger 12, heated therein, and then supplied to the heating circuit 40, where it has a heat-delivering influence on the state of the liquid inside the container, for example. The heat exchanger 12 and the healing circuit 40 are then switched hack out of the medium loop 3 by corresponding changeover of the changeover valves 35, 36, 38 when a state of the heated liquid is communicated by the container-side temperature sensor, for example. indicating that heating is no longer required.

However, the heat exchanger 12 may also be switched and/or incorporated in an autonomous medium loop 3' independent of the internal combustion engine 1 and its coolant loop—instead of the coolant loop of the internal combustion engine—as described above on the basis of FIGS. 6 and 7. The medium located in this medium loop 3' may be water or water mixed with antifreeze or any other suitable liquid, e.g. even a low-boiling liquid such as an ammonia-water mixture.

Figure 8:
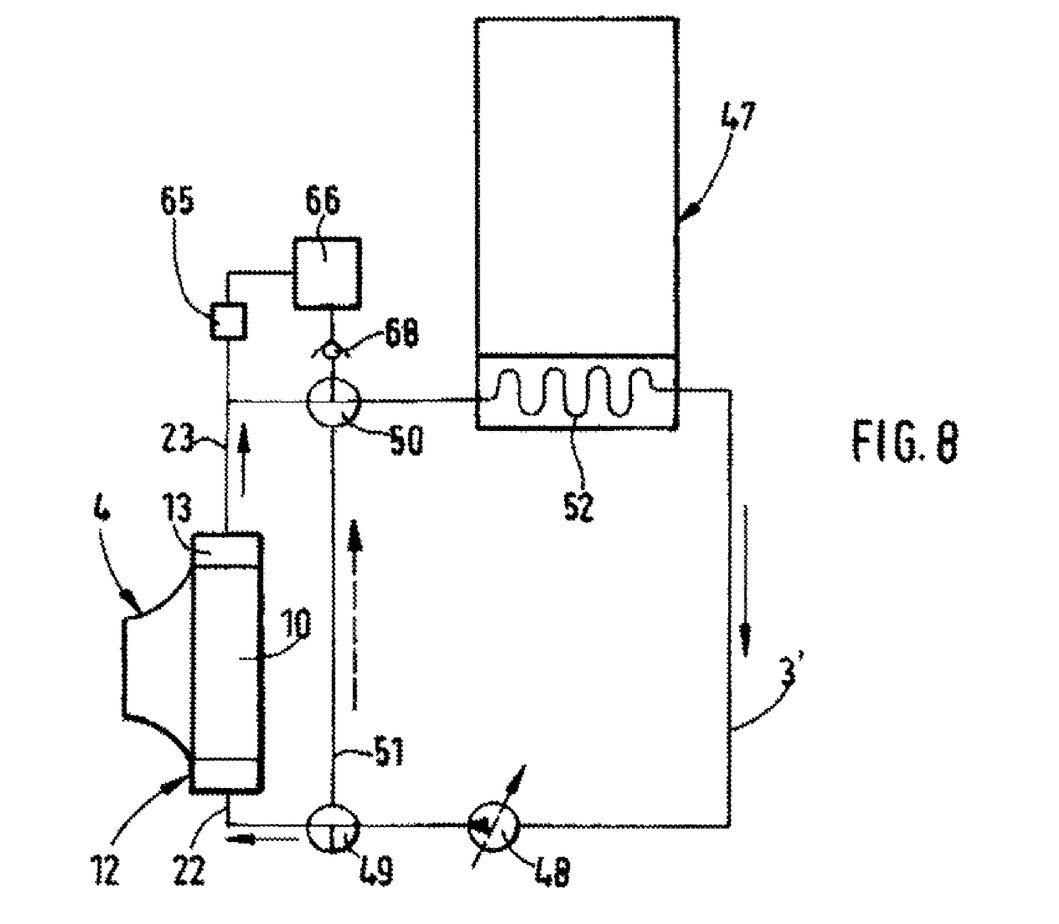
Figure 9:
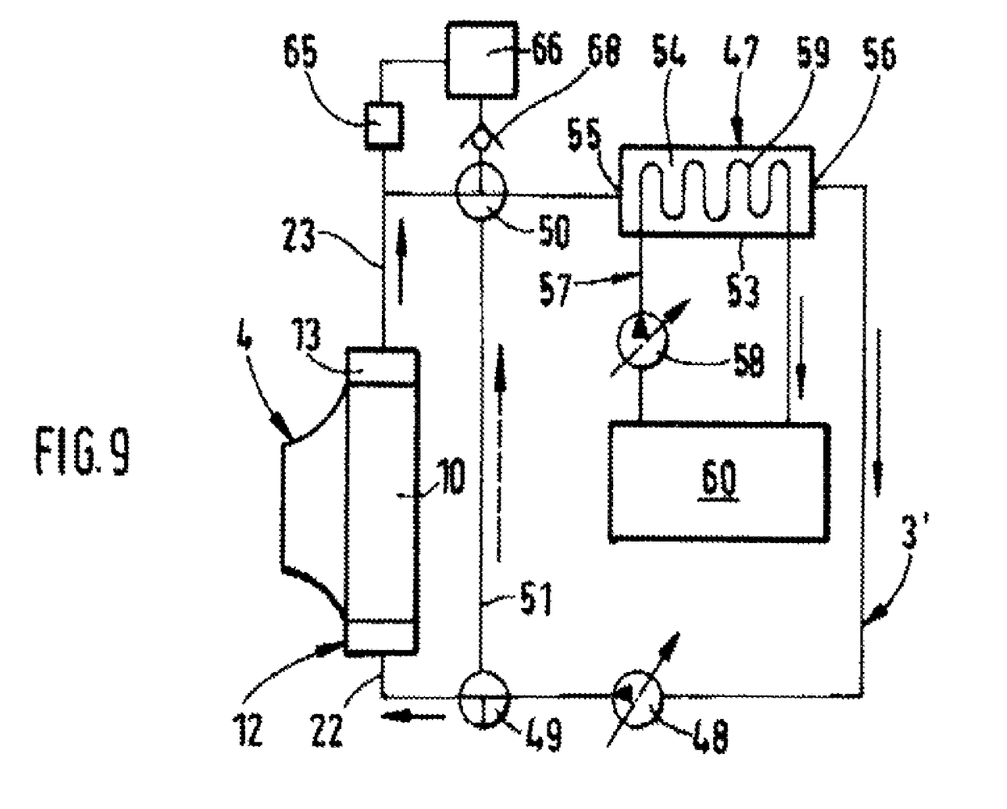
Figure 10:
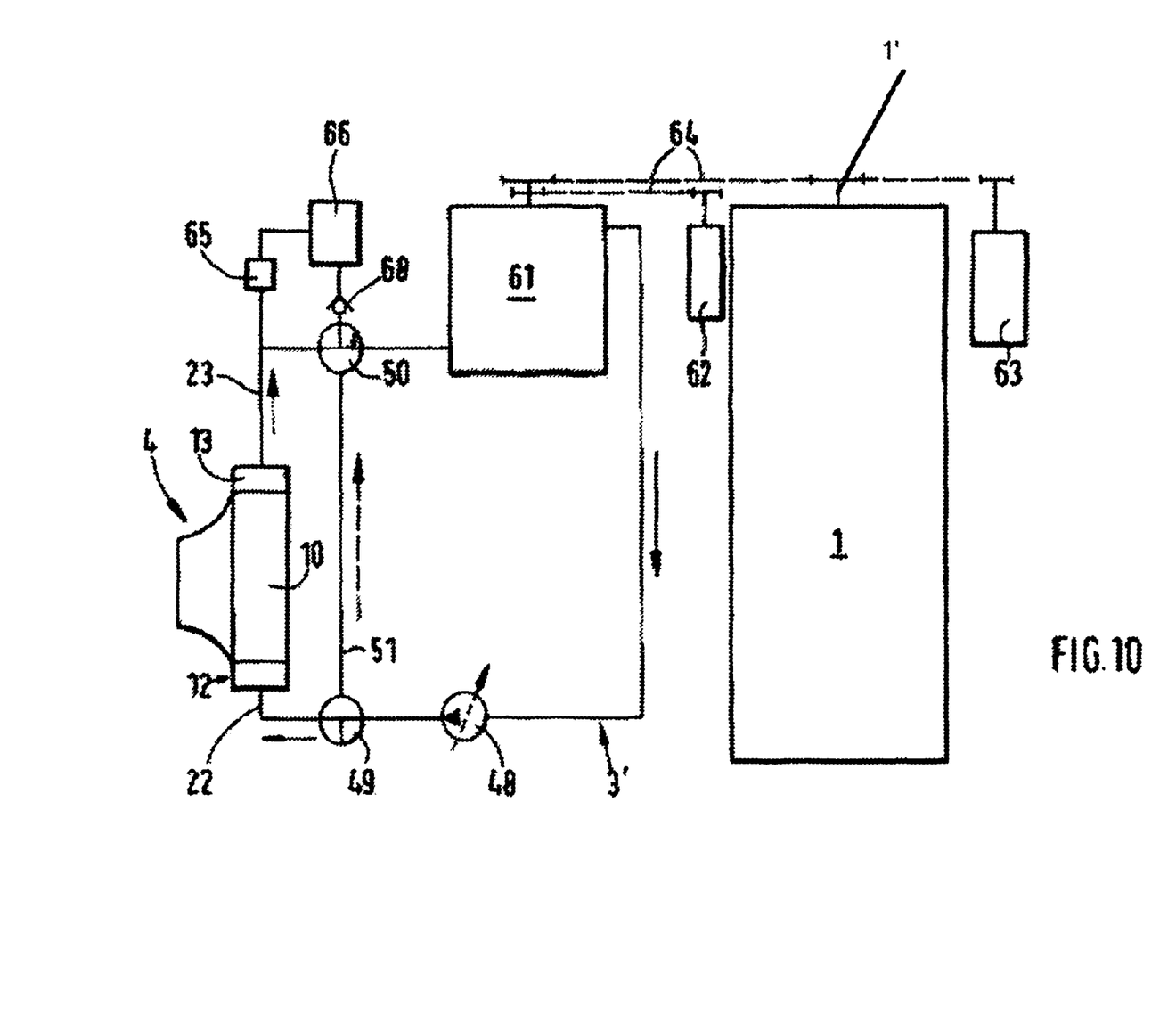

Examples of such autonomous medium loops 3' are illustrated in FIGS. 8 through 10.

Each of these medium loops 3 leads through or over a heat consumer 47. The medium enclosed in the medium loop 3' is circulated using a pump 48. Two changeover valves 49, 50, which are connected to one another by a line section 51 of the medium loop 3'. allow the heat exchanger 12 according to the present invention to be switched into the medium loop 3' or to be bypassed via the line section 51 which then acts as a bypass. depending on the switch position, in the case of FIG. 8, a container which contains and/or stores a liquid is shown as a heat consumer 47, which may also be like that (42) of a vehicle in FIG. 6, such as:

- a storage container for a urea-water solution, which would freeze at approximately −12° C., or
- a storage container for a windshield and/or headlight and/or outside mirror cleaning liquid, or
- a radiator conducting coolant water, or
- an equalizing container accommodating coolant water, or
- an electrical storage battery, or
- a heating element, or
- a hot-water container, e.g. in onboard kitchens of buses or mobile homes,
- a washing water storage container in onboard toilets of buses or mobile homes, or
- a second heat exchanger, via which a secondary medium loop leads.

As shown in FIG. 8, a heating pipe 52 is provided in or on the heat consumer 47, which is implemented, situated, or integrated in the wall in a similar or identical way to the heating pipe 41 of FIG. 7. The activation of the heat exchanger 12 for the purpose of heating the medium in the medium loop 3' and delivering heat in the area of the heat consumer 47 is performed here similarly as in the example of FIG. 7, i.e. as a function of a temperature detected using a sensor in and/or on the heat consumer 47 by influencing the switch position of the two changeover valves 49, 50 accordingly.

In the case of the example shown in FIG. 9. with an otherwise identical construction as in FIG. 8, the heat consumer 47 is formed by a further heat exchanger 53, whose interior 54, which is enclosed by a housing, is incorporated in the medium loop 3' via an inlet 55 and outlet 56 and may have the medium located therein flow through it. A secondary medium loop 57 is guided through the heat exchanger 53, in which a secondary medium circulated using a pump 58 is conductible via a heat exchanger pipe or pipe bundle 59, to which heat may be supplied from the first medium loop 3', situated in the interior 54 of the heat exchanger 53. The secondary medium heated in this way is supplied in the secondary medium loop 57 to a heat consumer 60 incorporated therein, such as a consumer or heat accumulator or a container which contains liquid In principle, the heat consumer 60 may, Inter alia, also be one of those (42. 47) cited in connection with FIGS. 7 and 8.

An exemplary application is described on the basis of FIG. 10. in which a low-boiling liquid is used as the medium, which is accommodated in a closed medium loop 3 and may be transferred from its normally liquid state of aggregation into a vaporous state as it flows through the heat exchanger 12 according to the present invention. The construction of the circuit is similar to that in FIG. 8. The heat consumer 47 is a steam turbine 61 in the case of FIG. 10, however, to which the medium transferred into its vaporous physical state in the heat exchanger 12 may be supplied and may deliver power while relaxing and cooling The steam turbine 61 has its drive connected to the crankshaft 1' of the internal combustion engine 1 and/or secondary assemblies 62. 63 thereof, such as dynamo, generator, pumps, air compressors, etc. or may be coupled and decoupled thereto via one or more switchable clutch(es), by which the vapor energy is convertible into mechanical energy. The relevant drivetrain(s) are identified by 64.

In all applications, it is to be ensured that when the heat exchanger 12 is taken back out of the medium loop after a phase of heating the medium by changing over the changeover valves 35, 36, 38: 49, 50 and is bypassed via the bypass line 37, 51, the heated medium still located in the disconnected switching section between the changeover valves 35, 36 (FIG. 6) or 35. 38 (FIG. 7) or 49, 50 (FIGS. 8, 9. 10) in the heat exchanger 12 may relax or expand. For this purpose, an overpressure valve 65 is connected at a suitable point to this switching section, which communicates with a relaxation and cooling chamber 66 for the discharged medium. The medium may then be fed therefrom to a medium equalization or storage container 67 (see FIGS. 6. 7) or back into the medium loop 3, 3* via a check valve 68, which only allows passage in the feed direction (see FIGS. 8, 9, 10), for example.

In addition. in all applications, a preferably electronic, computer-supported regulating and control unit is provided, which, by a program and predefined input setpoint values, controls the operation and the speeds of the pumps 34, 48, 58 and the switching/changeover of the changeover valves 35, 36, 38, 49, 50 for activating and de-activating the heat exchanger 12 as a heat source, on the basis of actual values supplied thereto, such as temperature values at the heat consumer and flow and pressure values in the medium loops 3, 3', 57.

In addition, in general the heat exchanger 12 may function to a certain extent as a cooling element on the exhaust gas turbine 4 of the exhaust gas turbocharger, because it at least partially externally shields the turbine housing and thus reduces the outwardly acting heat emission in particular in connection with the medium flowing through. External thermal insulators or shields may thus either be entirely dispensed with or only have to be implemented in reduced and/or simplified form The specification incorporates by reference the disclosure of German priority document 102006011 797.2 filed Mar. 15, 2006.

The present invention is, of course, in no way restricted to the specific disclosure of the specification and drawings, but also encompasses any modifications within the scope of the appended claims.

The invention claimed is:

1. A vehicle or stationary power plant having an internal combustion engine as a drive source and having components that are to be supplied with heat from a medium accommodated in a closed medium loop, comprising:
   an exhaust gas turbocharger for turbocharging said internal combustion engine, wherein said exhaust gas turbocharger includes a turbine having a turbine housing and acting as a heat source; and
   a heat exchanger having a housing, said heat exchanger having an external wall area that is disposed directly on an external wall of said turbine housing as an integral component of the turbine, wherein said external wall area of said heat exchanger is shaped to correspond to said external wall of said turbine housing and a further external wall cast or attached to said external wall of the turbine housing in a close-fit manner such that no space exists between said external wall area of said heat exchanger and said external wall of said turbine housing, wherein said heat exchanger is incorporated in said medium loop, wherein said medium is to be conveyed directly or in a channeled manner through an interior of said heat exchanger, wherein in said interior of said heat exchanger said medium is to be heated up utilizing at least thermal radiation energy from said turbine housing, and
   wherein said heat exchanger has a first connection connected to a supply line for said medium that is to be heated and a second connection that is spaced from said first connection, wherein a discharge line for heated-up medium is connected to said second connection,
   wherein a heat exchanger pipe extends between said first connection and said second connection of said heat exchanger or wherein a heat exchanger pipe bundle extends between two terminal collection chambers, wherein the medium to be heated is conducted through said heat exchanger pipe or heat exchanger pipe bundle in a channeled or piped manner.

2. The vehicle or stationary power plant according to claim 1, wherein said medium is to be conveyed in a channeled or piped manner through said interior of said heat exchanger, wherein exhaust gas is to be supplied into or conveyed through said interior of said heat exchanger, and wherein the heat content of said exhaust gas is to be used to heat up said medium.

3. The vehicle or stationary power plant according to claim 1, wherein a contact surface of said heat exchanger housing has a shape that is tailored to and conforms to an external region of said turbine housing to optimize heat transmission, wherein the first connection that is connected to the supply line for said medium that is to be heated is disposed on said housing, and wherein the second connection that is connected to the discharge line for heated-up medium is disposed on said housing, and wherein the heat exchanger pipe extends between said first connection and said second connection of said heat exchanger housing through said interior of said heat exchanger, or wherein the heat exchanger pipe bundle extends between two terminal collection chambers.

4. The vehicle or stationary power plant according to claim 1, wherein the supply line for said medium that is to be heated is connected to said housing at said first connection, and wherein the discharge line for heated-up medium is connected to said housing at said second connection that is spaced from said first connection.

5. The vehicle or stationary power plant according to claim 4, wherein said heat exchanger pipe is provided externally with heat-transmitting ribs.

6. The vehicle or stationary power plant according to claim 4, wherein said heat exchanger pipe extends linearly or in a meandering fashion between said first connection and said second connection.

7. The vehicle or stationary power plant according to claim 4, wherein said heat exchanger pipe or a heat exchanger pipe bundle is a component of a heat exchanger cartridge that also contains said first connection and said second connection and is to be installed prefabricated into said heat exchanger housing so as to extend between said supply line and said discharge line.

8. The vehicle or stationary power plant according to claim 4, wherein said heat exchanger pipe or heat exchanger pipes are to be additionally heatable by exhaust gas that is to be diverted from an exhaust gas system prior to or at an intake of said exhaust gas turbine and to be supplied in a channeled manner into said interior of said heat exchanger and, after a certain heat-dissipating dwell time, is to be conveyed out of said interior, at a location remote from the point of introduction into the exhaust gas system at or after an outlet of said exhaust gas turbine.

9. The vehicle or stationary power plant according to claim 1, wherein said medium that is to be heated is to be conveyed via said supply line and said first connection directly into said interior of said housing of said heat exchanger or contact with a hot external wall of said turbine housing or an external wall area of said heat exchanger housing heated by said external turbine housing wall for heating said medium, wherein said medium is to be conveyed back out of said interior of said heat exchanger housing via said second connection, and wherein said medium is to be supplied via said discharge line into said medium loop.

10. The vehicle or stationary power plant according to claim 1, wherein said heat exchanger is in the form of a heat exchanger pipe that is attached, in a bent or meandering fashion, externally to said turbine housing of said exhaust gas turbocharger so as to be tailored and conforming to the shape of an external area of said turbine housing to optimize heat transmission.

11. The vehicle or stationary power plant according to claim 10, wherein an intake of said heat exchanger pipe is connected to a first connection to which is attached a supply line for said medium to be heated, and wherein an outlet of said heat exchanger pipe is connected to a second connection to which is attached a discharge line for heated-up medium.

12. The vehicle or stationary power plant according to claim 1, wherein a pump is provided for circulating said medium in said medium loop, wherein switchable changeover valves are provided, wherein said heat exchanger is switchable into and out of said medium loop via a supply line and a discharge line by means of said changeover valves, wherein a first and a second one of said changeover valves are interconnected by a line section, and wherein said line section is to bypass said heat exchanger, in said medium loop, if said heat exchanger is not switched into said medium loop.

13. The vehicle or stationary power plant according to claim 12, wherein said medium is a liquid coolant of said internal combustion engine, and wherein said medium loop is a cooling loop of said internal combustion engine into which said heat exchanger is switchable via said supply line and said discharge line as a return line via said switchable changeover valves for rapid heating of said coolant after a cold start of said internal combustion engine as a function of a temperature-controlled regulator/controller.

14. The vehicle or stationary power plant according to claim 13, wherein a third one of said changeover valves is connected to said second one of said changeover valves via a line section and is connected to said discharge line of said heat exchanger, wherein a heating circuit is provided that operates via a container or other heat consumer, is connected to said second and said third ones of said changeover valves, and is switchable, via an appropriately switched-over one of said changeover valves, into said medium loop in series with said heat exchanger, and wherein switching of said heating circuit is temperature-controlled via a controller/regulator that is to have a corresponding influence on the switching position of said three changeover valves.

15. The vehicle or stationary power plant according to claim 13, wherein a liquid enclosed or stored in a heat consumer is to be warmed and/or heated, or prevented from freezing, or thawed after freezing after a cold start of said internal combustion engine, via said medium loop and a heating circuit switched therein, as a function of a temperature-controlled regulator/controller.

16. The vehicle or stationary power plant according to claim 15, wherein said heat consumer is a container, and is selected from the group consisting of a storage container for a urea-water solution, a storage container for at least one of a windshield, headlight, and outside mirror cleaning liquid, a radiator that conducts coolant water, an equalization container that accommodates coolant water, an electrical storage battery, a heating element, a hot-water container, and a washing water storage container.

17. The vehicle or stationary power plant according to claim 12, wherein said heat exchanger is switchable or incorporated into an autonomous medium loop that is independent of said internal combustion engine and a coolant loop thereof, wherein a pump is provided for circulating said medium in said autonomous medium loop, and wherein said first and second changeover valves, which are connected by said line section, are, in a controllable manner, to switch said heat exchanger into said medium loop or to bypass said heat exchanger via said line section, which then acts as a bypass.

18. The vehicle or stationary power plant according to claim 12, wherein a heat consumer in the form of a heat exchanger is provided, wherein a secondary medium loop that extends through an interior of said heat consumer is provided, wherein a further heat consumer is disposed in said secondary medium loop, wherein a pump is provided that is to circulate a secondary medium in said secondary medium loop, wherein said secondary medium is to be conveyed through a heat exchanger pipe or pipe bundle disposed in said interior of said heat consumer for receiving heat from said first medium loop, wherein heat thus absorbed is to be transferred to said secondary medium for heating thereof, and wherein said heated secondary medium is to be supplied to said further heat consumer.

19. The vehicle or stationary power plant according to claim 12, wherein said medium is a low-boiling liquid that is accommodated in said closed medium loop and is convertible into a vaporous state as said medium goes through said heat exchanger.

20. The vehicle or stationary power plant according to claim 19, wherein said medium, which is convertible into the vaporous state in said heat exchanger, is to be supplied to a steam turbine, which is integrated into said medium loop and functions as a heat consumer, and to there be effective to deliver power, and wherein said steam turbine is to be connected or to be coupled and decoupled via at least one switchable clutch to a crankshaft of said internal combustion engine and/or to secondary assemblies via at least one drivetrain and to thus convert vapor energy into mechanical drive energy.

21. The vehicle or stationary power plant according to claim 12, wherein an overpressure valve is disposed in said medium loop between said heat exchanger and ones of said changeover valves, and wherein if said heat exchanger is not switched into said medium loop, heating medium still located in said medium loop and/or in said supply line and said discharge line is to expand in an expansion and cooling chamber that is disposed downstream of said overpressure valve.

22. The vehicle or stationary power plant according to claim 12, wherein an electronic, computer-supported regulating and controlling unit is provided to control operation and speeds of pumps and switching/changeover of said changeover valves, for activating and deactivating of said heat exchanger as a heat source, via a program stored on a non-transitory computer-readable media to executable instructions of predefining input set point values, on the basis of actual values applied thereto, including temperature values detected at a heat consumer and flow and pressure values detected in said medium loop.

* * * * *